US010900366B2

(12) United States Patent
Princivalle et al.

(10) Patent No.: US 10,900,366 B2
(45) Date of Patent: Jan. 26, 2021

(54) PASSAGEWAY BETWEEN A SHROUD AND A ROTOR PLATFORM IN A TURBINE ENGINE

(71) Applicant: SAFRAN AERO BOOSTERS SA, Herstal (BE)

(72) Inventors: Rémy Princivalle, Haccourt (BE); Enrique Penalver Castro, Olne (BE); Matthieu Janssens, Merdorp (BE)

(73) Assignee: SAFRAN AERO BOOSTERS SA, Herstal (BE)

( * ) Notice: Subject to any disclaimer, the term of this patent is extended or adjusted under 35 U.S.C. 154(b) by 76 days.

(21) Appl. No.: 16/259,262

(22) Filed: Jan. 28, 2019

(65) Prior Publication Data

US 2019/0234224 A1 Aug. 1, 2019

(51) Int. Cl.

| F01D 5/14 | (2006.01) |
|---|---|
| F01D 11/00 | (2006.01) |
| F01D 5/08 | (2006.01) |
| F04D 29/68 | (2006.01) |
| F04D 29/32 | (2006.01) |
| F01D 5/06 | (2006.01) |

(Continued)

(52) U.S. Cl.
CPC .............. *F01D 11/001* (2013.01); *F01D 5/06* (2013.01); *F01D 5/081* (2013.01); *F01D 5/143* (2013.01); *F01D 11/02* (2013.01); *F04D 29/324* (2013.01); *F04D 29/684* (2013.01); *F01D 9/041* (2013.01); *F01D 11/122* (2013.01); *F05D 2240/80* (2013.01); *F05D 2240/81* (2013.01); *F05D 2250/232* (2013.01); *F05D 2260/20* (2013.01); *F05D 2260/6022* (2013.01)

(58) Field of Classification Search
CPC .......... F01D 11/001; F01D 11/02; F01D 5/06; F01D 5/143; F01D 9/041; F05D 2240/80; F04D 29/324
See application file for complete search history.

(56) References Cited

U.S. PATENT DOCUMENTS 4,507,052 A 3/1985 Thompson
5,967,745 A * 10/1999 Tomita .................. F01D 11/001
415/173.7

(Continued)

FOREIGN PATENT DOCUMENTS

WO 01/81731 A1 11/2001

OTHER PUBLICATIONS

Search Report dated Sep. 19, 2018 for BE 201805051.

*Primary Examiner* — Ninh H. Nguyen
(74) *Attorney, Agent, or Firm* — James E. Walton

(57) ABSTRACT

A turbomachine assembly and, in particular, a low-pressure compressor of an aircraft turbojet engine includes an annular row of upstream vanes with trailing edges extending radially from an upstream support; an annular row of downstream vanes with leading edges axially facing the trailing edges and extending radially from a downstream support; an annular passageway delimited by the upstream support and the downstream support. The downstream support has a profile with: an upstream portion delimiting the annular passageway forming an annular slide, a downstream portion axially at the level of downstream vanes, and a connecting arc connecting the upstream portion to the downstream portion. The connecting arc is arranged downstream of the leading edges.

14 Claims, 4 Drawing Sheets

(51) Int. Cl.
*F01D 11/02* (2006.01)
*F01D 9/04* (2006.01)
*F01D 11/12* (2006.01)

(56) References Cited

U.S. PATENT DOCUMENTS

| | | | |
|---|---|---|---|
| 7,114,339 B2 * | 10/2006 | Alvanos | F01D 5/081 60/806 |
| 9,850,774 B2 * | 12/2017 | Vo | F02C 7/28 |
| 2008/0310961 A1 | 12/2008 | Guemmer | |
| 2016/0153304 A1 * | 6/2016 | Aggarwala | F01D 11/02 416/185 |
| 2016/0298477 A1 | 10/2016 | Guemmer | |

* cited by examiner

PASSAGEWAY BETWEEN A SHROUD AND A ROTOR PLATFORM IN A TURBINE ENGINE

This application claims priority under 35 U.S.C. § 119 to Belgium Patent Application No. 2018/5051, filed 30 Jan. 2018, titled "Passageway Between a Shroud and a Rotor Platform in a Turbine Engine," which is incorporated herein by reference for all purposes.

BACKGROUND

1. Field of the Application

The present application relates to the circular space between a rotor platform and a turbomachine stator shroud. More specifically, the present application relates to the guiding of a flow in a passageway between a rotor platform and a stator shroud. The present application also relates to an axial turbomachine, in particular an aircraft turbojet engine or an aircraft turboprop engine. The present application also proposes a method for controlling the stability of a turbomachine compressor.

2. Description of Related Art

In operation, the air enclosed in a turbomachine compressor rotor tends to heat up due to its viscoelastic properties. One way to counteract this effect is to generate a flow of fresh air through the rotor and escaping upstream of the rotor. This cooling air is then reinjected radially into the primary vein but this creates disturbances when this cooling air encounters the primary flow of air of the turbomachine.

In addition, the cooling air can join a parasitic flow bypassing a sealing device under an inner shroud. The combination of this parasitic flow and the cooling flow amplifies the disturbances in the primary vein, as does the leakage moving circumferentially between the rotor and the inner shroud. The importance of the disturbances can result in phenomena such as the "stalls" the compressor.

The document US 2016/0298477 A1 discloses a turbomachine comprising a row of stator vanes between two rows of rotor vanes. The inner shroud of the stator is separated from the rotor platforms by two circular plays where leaks are reintroduced tangentially to the primary flow. This small inclination between the reinjection and the main flow ensures the non-disturbance of the main flow. However, the overall design remains perfectible.

Although great strides have been made in the area of assembly of turbomachine compressors, many shortcomings remain.

DETAILED DESCRIPTION OF THE PREFERRED EMBODIMENT

Figure 1:
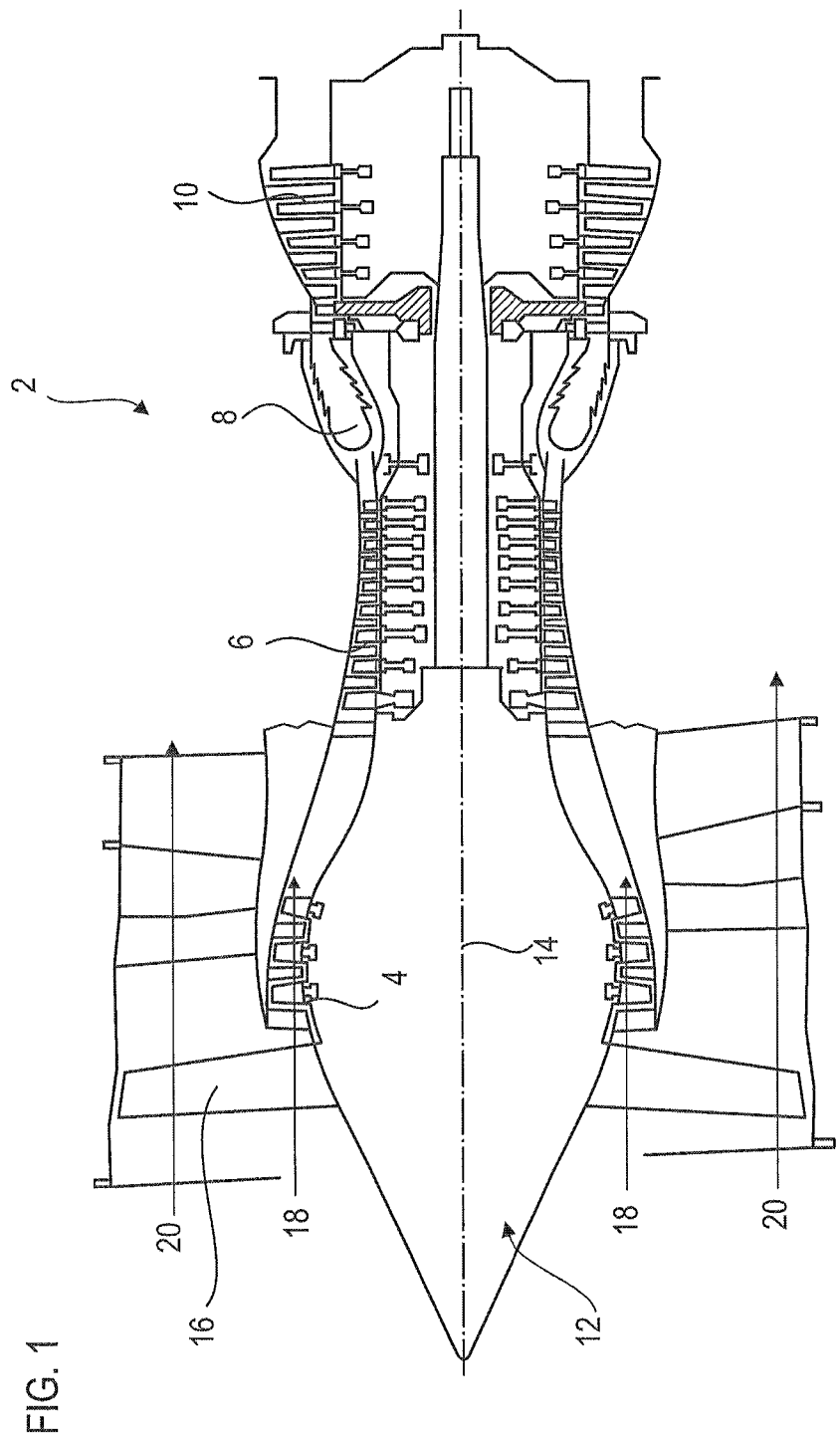
FIG. 1 shows an axial turbomachine according to the present application.

The present application aims at the reduction of the phenomena of detachment of the air flow from the guiding surfaces. The present application also aims to provide a simple solution, resistant, lightweight, economical, reliable, easy to produce, of convenient maintenance, of easy inspection, and of improved performance.

The subject of the present application is an assembly for a turbomachine, in particular for a turbomachine compressor, the assembly comprising: an annular row of upstream vanes with trailing edges extending radially from an upstream support; an annular row of downstream vanes with leading edges axially facing the trailing edges and extending radially from a downstream support; an annular passageway delimited by the upstream support and the downstream support; the downstream support comprising an outer surface with a profile comprising an upstream portion delimiting the annular passageway and a downstream portion; wherein the profile further comprises a connecting arc linking the upstream portion to the downstream portion, at least one leading edge being arranged upstream of the connecting arc. One of the rows of vanes is rotating along an axis of rotation of the compressor, the profile of the annular passageway has a median axis forming an angle $\alpha$ with the axis of rotation, the angle $\alpha$ being between 15° and 45°. The profile and the median axis are to be seen in a cross-section parallel to the axis of the compressor.

According to preferred embodiments of the present application, the assembly may comprise one or more of the following features, taken separately or according to all the possible technical combinations:

At least one radially inner end of the leading edge is arranged upstream of the connecting arc.

Each downstream vane has a chord line and an axial offset G between the connecting arc and its leading edge, said axial offset G being less than or equal to 10% of the chord line, preferably less than or equal to 25% of the chord line.

The upstream support has an outer surface tangential to, and aligned with, the downstream portion.

The leading edges extend radially from the upstream portion.

The upstream support has a cone-shaped inner surface delimiting the annular passageway.

The compressor has a dipping and/or converging vein in which the rotor vanes are disposed.

The upstream portion and/or the downstream portion are straight, and/or the connecting arc has a constant radius of curvature.

The at least one or each leading edge axially overlaps the connecting arc.

The downstream portion extends axially on most of half of the downstream support.

The upstream support and the downstream support comprise an abradable sealing device axially at the level of the annular passageway.

The upstream portion and the downstream portion are inclined relative to each other by at most: 30° or 20° or 10°.

Inside the annular passageway, the height C is constant.

The downstream support has an annular edge delimiting the annular passageway.

The upstream support has an annular groove open axially downstream, the upstream portion being at least partially housed in said annular groove.

The length E of the passageway is greater than or equal to the height C of the passageway.

The radius of the connecting arc is greater than the length E of the passageway and/or the height C of the passageway, possibly at least twice higher.

The length E of the passageway is greater than the thickness of one of the vanes downstream at the downstream support.

The downstream support has an annular groove open axially upstream and wherein the upstream support is engaged axially.

The length E and the height C of the passageway can be measured, at a given point of the passageway, according to the flow and perpendicular to the flow respectively.

The upstream support and the downstream support overlap axially.

The upstream portion and the downstream portion are inclined relative to each other, for example at least 2°, or 3° or 5° or 10°.

The upstream and downstream supports are arranged at the inner ends of the vanes.

The connecting arc is located downstream of the leading edges.

The assembly comprises an axial gap B between the downstream end of the upstream support and the leading edge, the axial gap B being greater than or equal to the axial length of the passageway.

The upstream vanes are stator vanes, the upstream support is an inner ferrule, the downstream vanes are rotor vanes, the downstream support is a rotor annular platform.

The compressor rotor is set to rotate at least at: 10000 rpm, or 15000 rpm, or 18000 rpm.

The present application also relates to a compressor assembly comprising an annular row of upstream vanes connected by an upstream support; an annular row of downstream vanes connected by a downstream support, the downstream vanes having leading edges; an annular passageway delimited by the upstream support and the downstream support, wherein the downstream support comprises a conical surface and a toroidal surface portion linked to, and downstream of, the conical surface, the toroidal surface portion being arranged axially downstream of the leading edges of the downstream vanes. The toroidal surface portion is another way of picturing the connecting arc.

The subject of the present application is also a turbomachine, in particular an aircraft turbojet engine, the turbomachine comprising an assembly, remarkable in that the assembly is in accordance with the present application, preferably the rotor is a drum that also supports a third annular row. vanes arranged upstream of the upstream vanes.

According to an advantageous embodiment of the present application, the turbomachine comprises an air sampling orifice communicating with its external environment, said orifice being disposed upstream of the annular passageway and/or communicating with said annular passageway in order to cool the drum.

The present application also relates to a stability control method of a turbomachine compressor, the compressor including an assembly with an annular row of upstream vanes with trailing edges extending radially from an upstream support; an annular row of downstream vanes with leading edges axially facing the trailing edges and extending radially from a downstream support; an annular passageway defined by the upstream support and the downstream support; the downstream support comprising an outer surface with a profile comprising an upstream portion delimiting the annular passageway and a downstream portion; remarkable in that the profile further comprises a connecting arc linking the upstream portion to the downstream portion, and in that the method comprises a compressor operating step during which an flow passes through the annular passageway being inclined with respect to downstream portion of an angle less than or equal to 15° or 10° or 5°; the assembly being in accordance with the embodiments exposed above.

According to an advantageous embodiment of the present application, during the compressor operating step, the flow joins a boundary layer in contact with the outer surface, and in particular the upstream portion; the flow and the boundary layer are inclined relative to each other by at most: 30°, or 25° or 20°, or 15°, or 10°, or 5°.

According to an advantageous embodiment of the present application, during the compressor operating step, the flow joins an annular flow axially passing through the compressor; in profile the flow and the annular flow are inclined relative to each other by at most: 20°, or 15°, or 10°, or 5°.

According to an advantageous embodiment of the present application, the compressor comprises a rotor supporting the annular row of upstream vanes or the annular row of vanes downstream, during the compressor operating step the rotor rotates at a speed of at least: 10000 rpm, or 15000 rpm, or 18000 rpm, or 20000 rpm.

According to an advantageous embodiment of the present application, during the compressor operating step, the flow cools down the downstream support.

In general, the advantageous modes of each object of the present application are also applicable to the other objects of the present application. Each object of the present application is combinable with the other objects, and the objects of the present application are also combinable with the embodiments of the description, which in addition are combinable with each other, according to all the possible technical combinations, unless otherwise not explicitly mentioned.

The present application proposes a specific annular channel geometry that limits the impact of the reinjection of an air flow between two successive annular bands. The position of the leading edges upstream of the edge of the shroud or platform facilitates the flow and allows a more progressive modification of the vein. The present geometry may be provided upstream and downstream of each ferrule and each platform.

Thanks to the present application, for example through the angle β, through the radius of curvature R of the connecting arc, and through the axial gap G, the detachment of the reinjected flow from the shrouds is avoided, the primary flow "Sticks" more to the annular walls that delimit it. Thus, efficiency and stability are improved.

In the following description, the wording "internal" and "external" refer to a positioning relative to the axis of rotation of an axial turbomachine. The axial direction corresponds to the direction along the axis of rotation of the turbomachine. The radial direction is perpendicular to the axis of rotation. Upstream and downstream are in reference to the main direction of the flow in the turbomachine.

FIG. 1 is a simplified representation of an axial turbomachine. It is in this case a two-flow turbojet engine. The turbojet engine 2 comprises a first compression level, i.e. a low-pressure compressor 4, a second compression level, i.e. a high-pressure compressor 6, a combustion chamber 8 and one or more stages of turbines 10. In operation, the mechanical power of the turbine 10 that is transmitted via the central shaft to the rotor 12 sets in motion the two compressors 4 and 6. The latter comprise several rows of rotor vanes associated with rows of stator vanes. The rotation of the rotor about its axis of rotation 14 thus makes it possible to generate an air flow and to compress it progressively until it reaches the combustion chamber 8.

A commonly designated fan or blower inlet fan 16 is coupled to the rotor 12 and generates an air flow which splits into a primary flow 18 passing through the various aforementioned stages of the turbomachine, and into a secondary flow 20 passing through an annular duct (partially shown) along the machine to then join the primary flow at the turbine outlet.

The secondary flow can be accelerated so as to generate a thrust necessary for the flight of an aircraft. The primary 18 and secondary 20 streams are coaxial annular flows and are fitted into one another.

Figure 2:
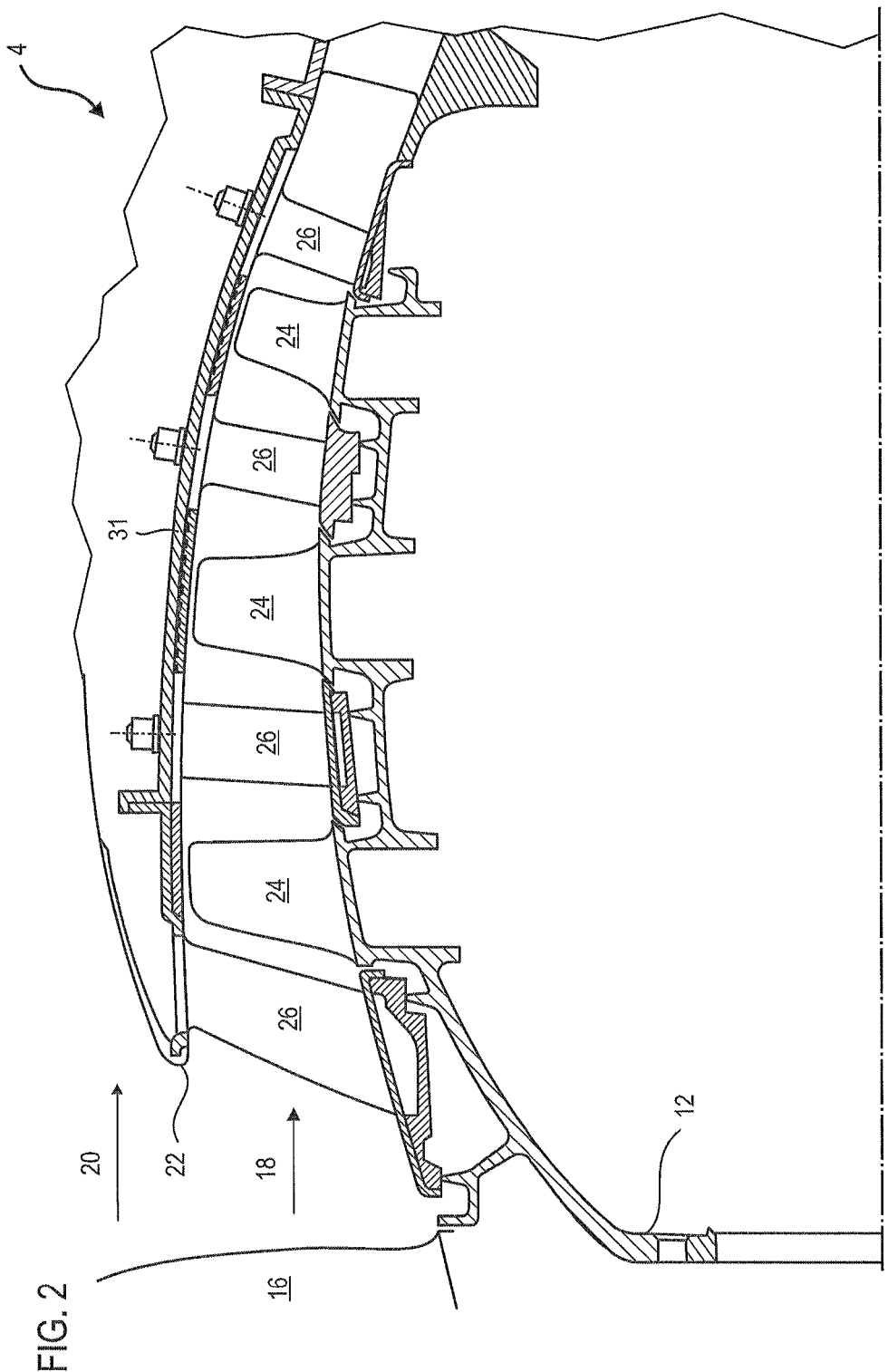
FIG. 2 is a diagram of a turbomachine compressor according to the present application.

FIG. 2 is a sectional view of a compressor of an axial turbomachine such as the one of FIG. 1. The flow can be transonic. The compressor may be a low-pressure compressor 4. One can see a portion of the blower 16 and the separation nozzle 22 of the primary flow 18 and the secondary flow 20. The rotor 12 comprises three rows of rotor vanes 24. The rotor 12 may be a bladed one-piece drum, or it may include vanes with dovetail inner ends.

The low-pressure compressor 4 comprises several stator stages, in this case four, each containing a row of stator vanes 26. Some stator vanes may be adjustable in orientation, also called variable-stator vanes. The stator stages are associated with the fan 16 or a row of rotor vanes to straighten the air flow, so as to convert the speed of the flow pressure, including static pressure.

The stator vanes 26 extend essentially radially from an outer casing 31, and can be fixed there and immobilized by means of axes. Optionally, the spacing between the vanes may vary locally as well as their angular orientations. Some vanes (24; 26) may differ from the rest of the vanes in their row. The housing 31 may be formed of several rings, or half-shrouds.

Figure 3:
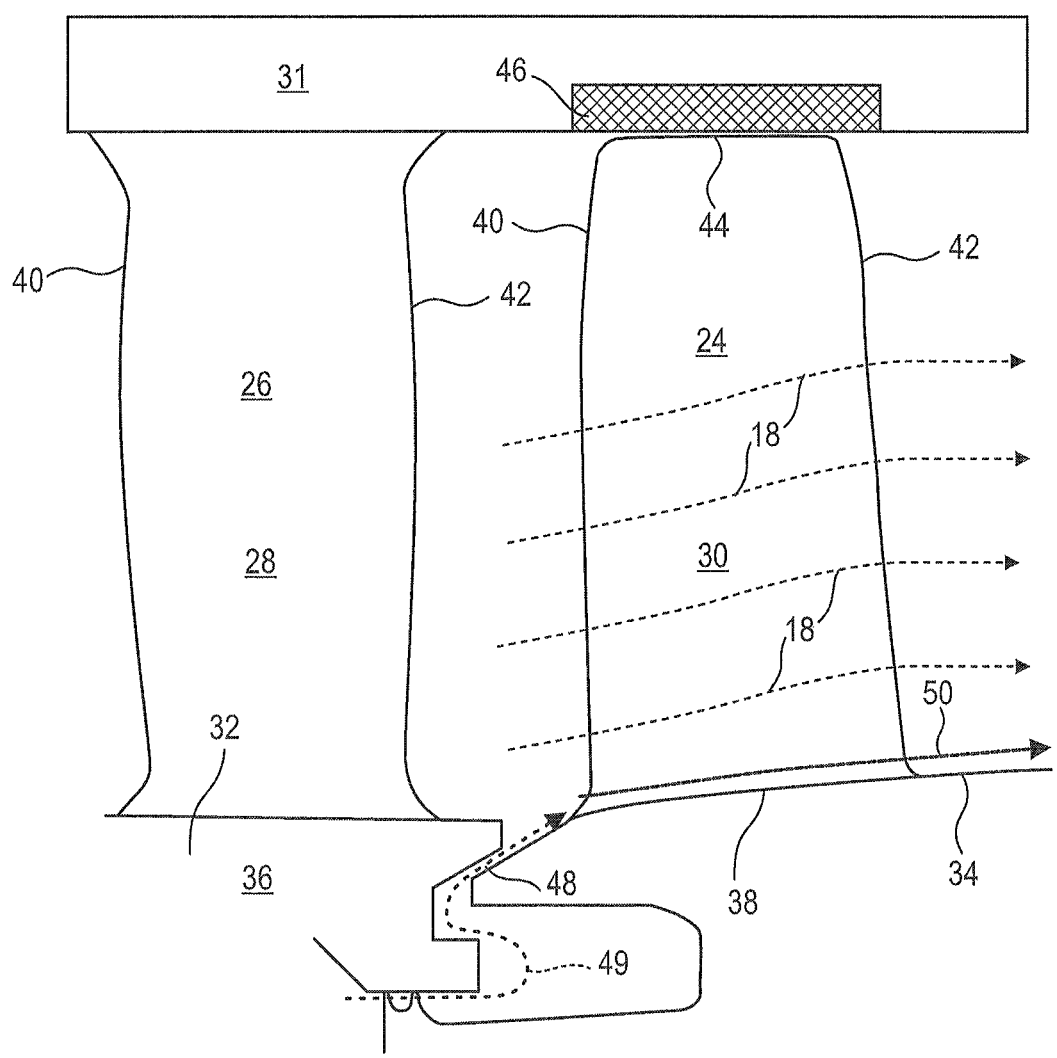
FIG. 3 illustrates a compression stage according to the present application.

FIG. 3 outlines a pair of compressor vanes, for example the compressor as shown in relation to FIG. 2. The entire annular row of vanes can comprise identical vanes.

The vanes may correspond to a first vane and a second vane, or to an upstream vane 28 and a downstream vane 30. These vanes may respectively correspond to a stator vane 26 and to a rotor vane 24 such as those mentioned in the preceding figures. The vanes extend radially and pass through the primary flow 18. They extend from the outer casing 31 of the compressor, and gain an inner ring 32 or an annular platform 34 which respectively form an upstream support 36 and a downstream support 38, or more generally a first support and a second support. These supports (36; 38) are annular. Each of them can be monobloc (i.e. integral). Potentially, the shroud can be made of several parts.

The vanes (24-28) each have a leading edge 40 and a trailing edge 42 which extend over the entire radial height of the corresponding vane. With respect to the upstream vane 28, the leading edge 40 and the trailing edge 42 connect the upstream support 36 to the outer casing 31. For the downstream vane 30, the leading edge 40 and the trailing edge 42 extend radially from the downstream support 38 to the head 44 of the downstream vane 30. The head 44 may be a free radial end of the downstream vane 30. In operation, this head 44 may come in contact with a layer of abradable material 46 arranged against the outer casing 31 to ensure a sealed arrangement; especially a dynamic seal.

The upstream support 36 and the downstream support 38 delimit between them an annular passageway 48. The annular passageway 48 is axially and radially between the supports (36; 38). An air flow 49 (also called "auxiliary stream" hereinafter), for example formed by a cooling flow and a leakage flow under the upstream support 36, passes through it. The annular passageway 48 has a direction of flow oriented downstream and substantially inclined with respect to the primary flow 18.

The annular passageway 48 may be substantially tangential or parallel to the boundary layer 50 flowing against the upstream support 36 and then against the downstream support 38. The boundary layer 50 may be cut by the downstream vane 30. The annular passageway 48 is mainly oriented axially downstream. It forms a circular mouth turned towards the leading edge 40 of the downstream vane 30.

In profile, the orientation of the auxiliary flow 49 given by the passageway 48 allows the primary flow 18 to maintain flow lines parallel to each other, and parallel to the downstream support 38. The present application maintains this configuration despite the presence of obstacles formed by downstream vanes 30.

The compressor can be configured so that its rotor operates, and thus runs at least 18,000 rpm. This means that its rotor, and in particular the rotor vanes 24 resist the corresponding centrifugal force. In addition, a precise dynamic balance must be made to reduce vibration during rotation of the rotor. The compressor can be a high-speed compressor, also called a fast booster.

The rotor of the compressor, for example in the case of a high-speed compressor, may be formed of disks, including bladed disk; that is to say disks where each vane row forms a one-piece assembly integral with the associated support disk.

Figure 4:
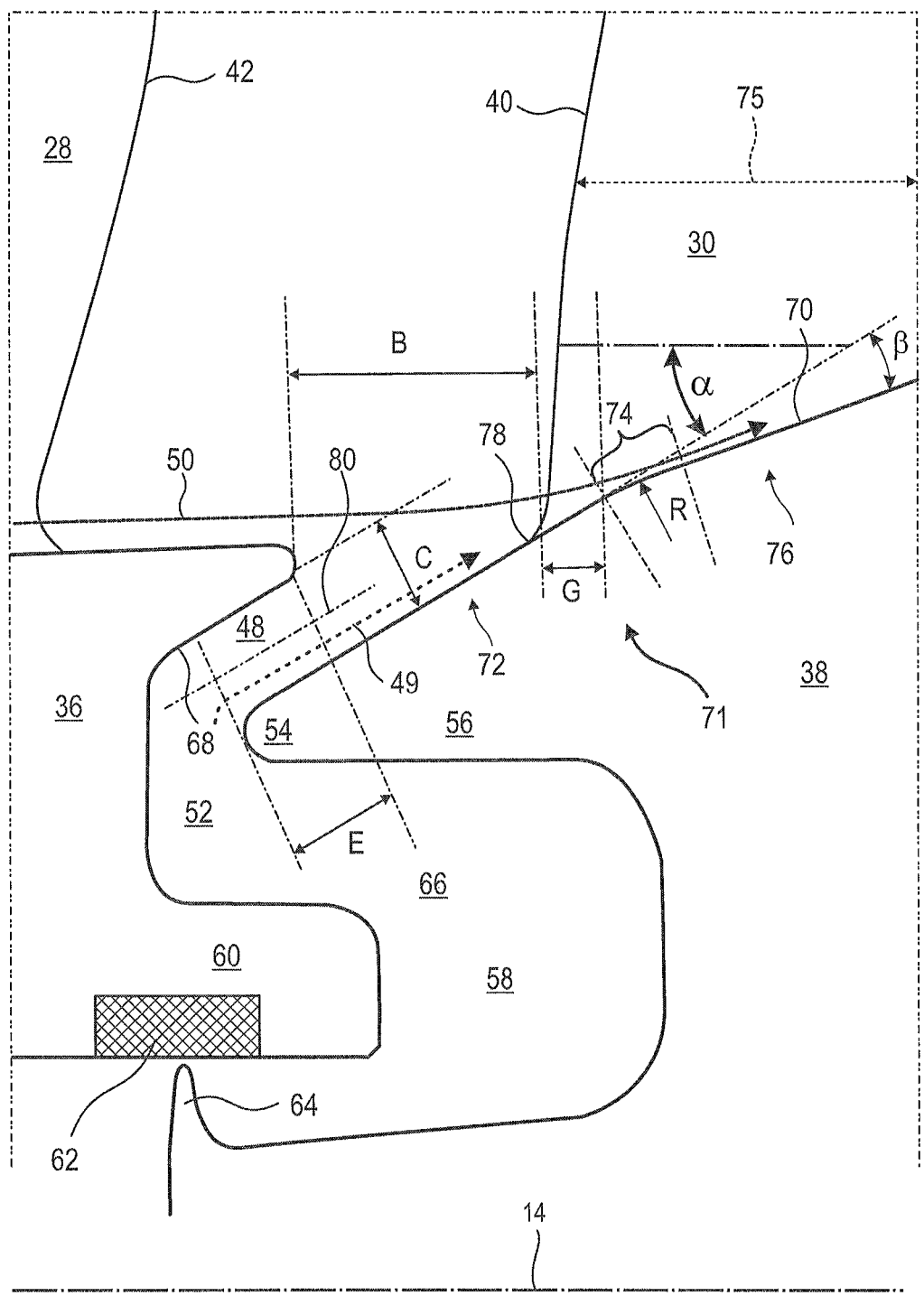
FIG. 4 is a side view of the annular passageway according to the present application.

FIG. 4 is a zoomed-in view of the annular passageway 48 formed between the upstream support 36 and the downstream support 38. The trailing edge 42 of the upstream vane 28 and the leading edge 40 of the downstream vane 30 are shown on both sides, and axially remote from, the annular passageway 48. Only two vanes are shown, however the present teaching is applicable to their entire respective rows.

The upstream support 36 may have a downstream groove 52 of annular shape around the axis of rotation 14. This downstream groove 52 may be open axially downstream, and receive an upstream end 54 of the downstream support, for example in the form of annular beak 56. Extending axially in the downstream groove 52, the upstream end 54 forms a first baffle. The downstream groove 52 may be part of the annular passageway 48. The latter may be formed around the upstream end 54 of the downstream support 38.

The downstream support 38 may show an annular groove 58 of annular shape about the axis of rotation 14. This upstream groove 58 may receive an internal surface 60, for example tubular, the upstream support 36 may form a second baffle. The internal surface 60 can receive a layer of abradable material 62 cooperating with an annular rib 64, also called wiper, formed on the downstream support 38, for example at the end of the upstream groove 58. The nesting of the supports (36; 38) via the interpenetration of their grooves (52; 58) creates a triple reversal of axial flow in the annular duct 66 which they delimit between them. This adds baffles, and limits leaks.

The annular passageway 48 is surrounded and therefore delimited by an inner annular surface 68 of the upstream support 36 of the downstream groove 52. This annular surface 68 may be substantially conical.

The downstream support 38 comprises an outer surface 70. The outer surface 70 may delimit the interior of the passageway 48 and the primary flow 18. It guides the boundary layer 50. The outer surface 70 has a profile 71 around the axis rotation 14 of the rotor. By "profile" is meant a curvilinear geometrical entity which is a projection of a surface on a plane transversal to the compressor and comprising axis 14. The external surface 70 is geometrically defined by rotation of the profile 71 around the axis 14.

The profile 71 comprises an upstream portion 72, a connecting arc 74 and a downstream portion 76. The downstream portion 76 may be axially at the downstream vane 30. The connecting arc 74 touches the two portions (72, 76), it connects them by forming their interface. The upstream portion 72 may be partially arranged in the downstream groove 52. It may delimit the passageway 48. It may be in contact with the intrados surface and the extrados surface of the downstream vane 30, and/or may receive the radial end 78 of the leading edge 40. Since the axial position of a point of the leading edge 40 varies over the radial height of such a point on the vane 30, the arc 74 can extend axially along the leading edge 40, which he overlaps axially.

The connecting arc 74 may be arranged downstream of the leading edge 40. In particular, the connecting arc 74 is recessed downstream of the inner end 78, also called the vane corner. An axial gap G, for example measured against the outer surface 70, separates the leading edge 40 from the connecting arc 74. The axial gap G can be greater than or equal to: 5%, or 10% of the chord line 75 of the downstream vane 30. The chord line 75 may be a medium chord line. It can connect the leading edge 40 to the trailing edge (not shown) of the downstream vane 30. The upstream portion 72 then forms a continuous slope slide where the leading edge 40 begins, in particular by receiving the internal end 78.

The upstream portion 72 and the downstream portion 76 are inclined relative to each other by an angle β, for example at least 5° or at least 10°. Each of them can be inclined relative to the axis of rotation 14, the upstream portion 72 being the most inclined. The upstream portion 72 can be inclined at an angle α of between 15° and 45°, possibly between 20° and 30° inclusive, with respect to the axis of rotation 14.

The connecting arc 74 may have a constant radius R. It can thus define a portion of toroidal surface which connects an upstream conical surface and a downstream conical surface which are respectively the upstream portion 72 and the downstream portion 76.

The passageway 48 has a length E according to the flow of the auxiliary flow 49 therethrough, and a height C perpendicular to the same auxiliary flow 49. The auxiliary flow 49 may be along the median axis 80 of the profile of the passageway 48. The axis median 80 may be parallel to the upstream portion 72, and relative to the inner surface 68. It may be inclined by the angle α with respect to the axis of rotation 14.

The length E may be greater than 90% of the height C. The ratio E/C may be greater than or equal to 1. The length E may be greater than the thickness of the downstream vane 30. The thickness of the downstream vane can be measured against the downstream support 38, potentially outside the radius of connection of the vane 30 to the support 38.

The radius R of the connecting arc 74 may be greater than the height C as the length E, for example at least twice as much. The radius can be between 10 mm and 100 mm. This improves the smoothness of connection, and limits the disturbances in the boundary layer 50. The vortices are limited, as are the detachments of the air flow at the leading edge 40.

The upstream portion 72 forms a link engaged in the passageway 48 and under the downstream vane 30. However, the leading edge 40 is offset relative to the passageway 48. It is separated by an axial distance B greater than the length E and/or at height C.

We claim:

1. A compressor assembly for a turbomachine, the assembly comprising:
    an annular row of upstream vanes with trailing edges extending radially from an upstream support;
    an annular row of downstream vanes with leading edges axially facing the trailing edges and extending radially from a downstream support; and
    an annular passageway delimited by the upstream support and the downstream support;
    wherein the downstream support comprises:
        an outer surface with a profile, said profile comprising:
            an upstream portion delimiting the annular passageway;
            a downstream portion; and
            a connecting arc connecting the upstream portion to the downstream portion, at least one of the leading edges being arranged upstream of the connecting arc;
    wherein one of the annular rows of vanes is rotatable around an axis of rotation and the annular passageway, when seen in a transversal cross-section parallel to said axis of rotation, has a median axis forming an angle with the axis of rotation of between 15° and 45°; and
    wherein each downstream vane has a chord line and an axial offset between the connecting arc and its leading edge, said axial offset being less than or equal to 10% of the length of the chord line.

2. The assembly according to claim 1, wherein at least one of the leading edges has a radially inner end arranged upstream of the connecting arc.

3. The assembly according to claim 1, wherein each downstream vane has a chord line and an axial offset between the connecting arc and its leading edge, said axial offset being greater than or equal to 5% of the length of the chord line.

4. The assembly according to claim 1, wherein the upstream support and the downstream support comprise:
    an abradable sealing device.

5. The assembly according to claim 1, wherein the upstream support has an annular groove that is axially downstream open, the upstream portion being at least partially arranged into said annular groove.

6. The assembly according to claim 1, wherein the length of the passageway is greater than or equal to the height of the passageway.

7. The assembly according to claim 1, wherein the assembly comprises:
    a drum or a disk supporting a third annular row of vanes arranged upstream of the upstream vanes.

8. The assembly according to claim 1, further comprising:
    an air bleed opening in fluidic communication with the annular passageway.

9. A compressor assembly for a turbomachine, the assembly comprising:
    an annular row of upstream vanes with trailing edges extending radially from an upstream support;
    an annular row of downstream vanes with leading edges axially facing the trailing edges and extending radially from a downstream support; and
    an annular passageway delimited by the upstream support and the downstream support;
    wherein the downstream support comprises:
    an outer surface with a profile, said profile comprising:
        an upstream portion delimiting the annular passageway;
        a downstream portion;
        a median axis forming an angle of between 15° and 45° with an axis of rotation; and a connecting arc connecting the upstream portion to the downstream portion, at least one of the leading edges being arranged upstream of the connecting arc;

wherein one of the annular rows of vanes is rotatable around the axis of rotation and the annular passageway, when seen in a transversal cross-section parallel to said axis of rotation; and wherein the downstream portion extends radially outwardly away from the connecting arc with respect to the axis of rotation.

10. A method for controlling the stability of a turbomachine compressor, the compressor including an assembly, the assembly comprising:

an annular row of upstream vanes with trailing edges extending radially from an upstream support;

an annular row of downstream vanes with leading edges axially facing the trailing edges and extending radially from a downstream support; and an annular passageway delimited by the upstream support and the downstream support, wherein the downstream support comprises:

an outer surface with a profile, said profile comprising:
an upstream portion delimiting the annular passageway;
a downstream portion; and
a connecting arc connecting the upstream portion to the downstream portion, at least one of the leading edges being arranged upstream of the connecting arc;

wherein one of the annular rows of vanes is rotatable around an axis of rotation and the annular passageway, when seen in a transversal cross-section parallel to said axis of rotation, has a median axis forming an angle with the axis of rotation of between 15° and 45°;

the method comprising:
a step of operating the compressor during which a flow of air passes through the annular passageway in a direction inclined with respect to the downstream portion of an inclination that is less than or equal to 10°.

11. The method of claim 10, wherein during the step of operating, the flow joins a boundary layer in contact with the outer surface; the flow and the boundary layer being inclined with respect to one another of less than 30°.

12. The method of claim 10, wherein during the step of operating, the flow joins an annular flow passing axially through the compressor; the auxiliary flow and the annular flow being inclined with respect to one another of less than 20°.

13. The method of claim 10, wherein the annular row of upstream vanes or the annular row of vanes downstream rotates during the step of operating, at a speed of at least 15000 rpm.

14. The method of claim 10, wherein during the step of operating, the flow cools down the downstream support.

* * * * *